(12) United States Patent
Fischer et al.

(10) Patent No.: US 6,576,585 B2
(45) Date of Patent: Jun. 10, 2003

(54) PROCESS FOR PRODUCING A CATALYST BODY

(75) Inventors: Stefan Fischer, Lichtenfeld (DE); Ronald Neufert, Michelau (DE); Günther Pajonk, Zapfendorf (DE); Frank Witzel, Bloomfield Hills, MI (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/822,038

(22) Filed: Mar. 29, 2001

(65) Prior Publication Data

US 2001/0025009 A1 Sep. 27, 2001

Related U.S. Application Data

(63) Continuation of application No. PCT/DE99/02941, filed on Sep. 14, 1999.

(30) Foreign Application Priority Data

Sep. 29, 1998 (DE) .......................... 198 44 758

(51) Int. Cl.[7] .................. B01J 21/08; B01J 21/12; B01J 21/14; B01J 23/00; B01J 23/20
(52) U.S. Cl. .............. 502/309; 502/242; 502/248; 502/254; 502/312; 502/323; 502/351; 502/354
(58) Field of Search ............... 502/104, 107, 502/113, 117, 242, 247, 248, 254, 309, 312, 323, 351, 354, 415, 439, 263; 501/134, 153, 154; 264/430, 433

(56) References Cited

U.S. PATENT DOCUMENTS 4,085,193 A    4/1978    Nakajima et al.
4,182,745 A  * 1/1980    Nishida et al. ......... 423/239 A
4,207,209 A  * 6/1980    Matsuda et al. ............. 252/462
4,255,285 A  * 3/1981    Engelbach et al. .......... 252/443
4,518,710 A  * 5/1985    Brennan ..................... 502/309
4,520,124 A  * 5/1985    Abe et al. .................... 502/159
4,722,918 A  * 2/1988    Schneider et al. ............. 502/81
4,746,483 A  * 5/1988    Flockenhaus et al. ....... 264/120
4,812,296 A  * 3/1989    Schmelz et al. ............. 423/239

(List continued on next page.)

FOREIGN PATENT DOCUMENTS

DE    35 20 024 A1    12/1986
DE    38 38 472 A1    7/1990
DE    296 15 192 U1   12/1996
EP    0 385 164 A2    9/1990
EP    0 552 715 A1    7/1993

*Primary Examiner*—Stanley S. Silverman
*Assistant Examiner*—Cam N. Nguyen
(74) *Attorney, Agent, or Firm*—Laurence A. Greenberg; Werner H. Stemer; Ralph E. Locher

(57) ABSTRACT

A process for producing a catalyst body includes providing titanium dioxide, tungsten trioxide, vanadium pentoxide, aluminum oxide, and/or silicon oxide for the catalyst body. A kneadable and/or shapable compound is processed to form a shaped body by extrusion or by coating of a support body. The shaped body is dried and is calcined to form an active compound. The calcined shaped body is artificially aged by a final heat treatment at a temperature higher than the calcination temperature to produce a catalyst body having a high resistance to deactivation at high temperatures. The starting materials include from 65 to 95% by weight of titanium dioxide, 2 to 30% by weight of tungsten trioxide, 0 to 2% by weight of vanadium pentoxide, preferably, less than 1.5%, 0.1 to 10% by weight of aluminum oxide, and 0.1 to 10% by weight of silicon dioxide. The final heat treatment is done is at 660 to 700° C., drying is at 20 to 100° C. prior to calcination, and calcination is at 400° C. to less than 700° C.

10 Claims, 1 Drawing Sheet

U.S. PATENT DOCUMENTS

| | | | | |
|---|---|---|---|---|
| 4,851,381 A | * | 7/1989 | Hums | 502/209 |
| 4,859,439 A | * | 8/1989 | Rikimaru et al. | 423/239 |
| 4,870,045 A | * | 9/1989 | Gasper et al. | 502/232 |
| 4,891,348 A | * | 1/1990 | Imanari et al. | 502/309 |
| 4,929,586 A | * | 5/1990 | Hegedus et al. | 502/271 |
| 4,946,661 A | * | 8/1990 | Tachi et al. | 423/239 |
| 4,966,882 A | * | 10/1990 | Kato et al. | 502/309 |
| 5,059,576 A | * | 10/1991 | Kato et al. | 502/309 |
| 5,198,403 A | * | 3/1993 | Brand et al. | 502/204 |
| 5,217,936 A | * | 6/1993 | Sarup et al. | 502/241 |
| 5,869,419 A | * | 2/1999 | Obayashi et al. | 502/305 |
| 5,945,372 A | * | 8/1999 | Langgraf et al. | 502/350 |

* cited by examiner

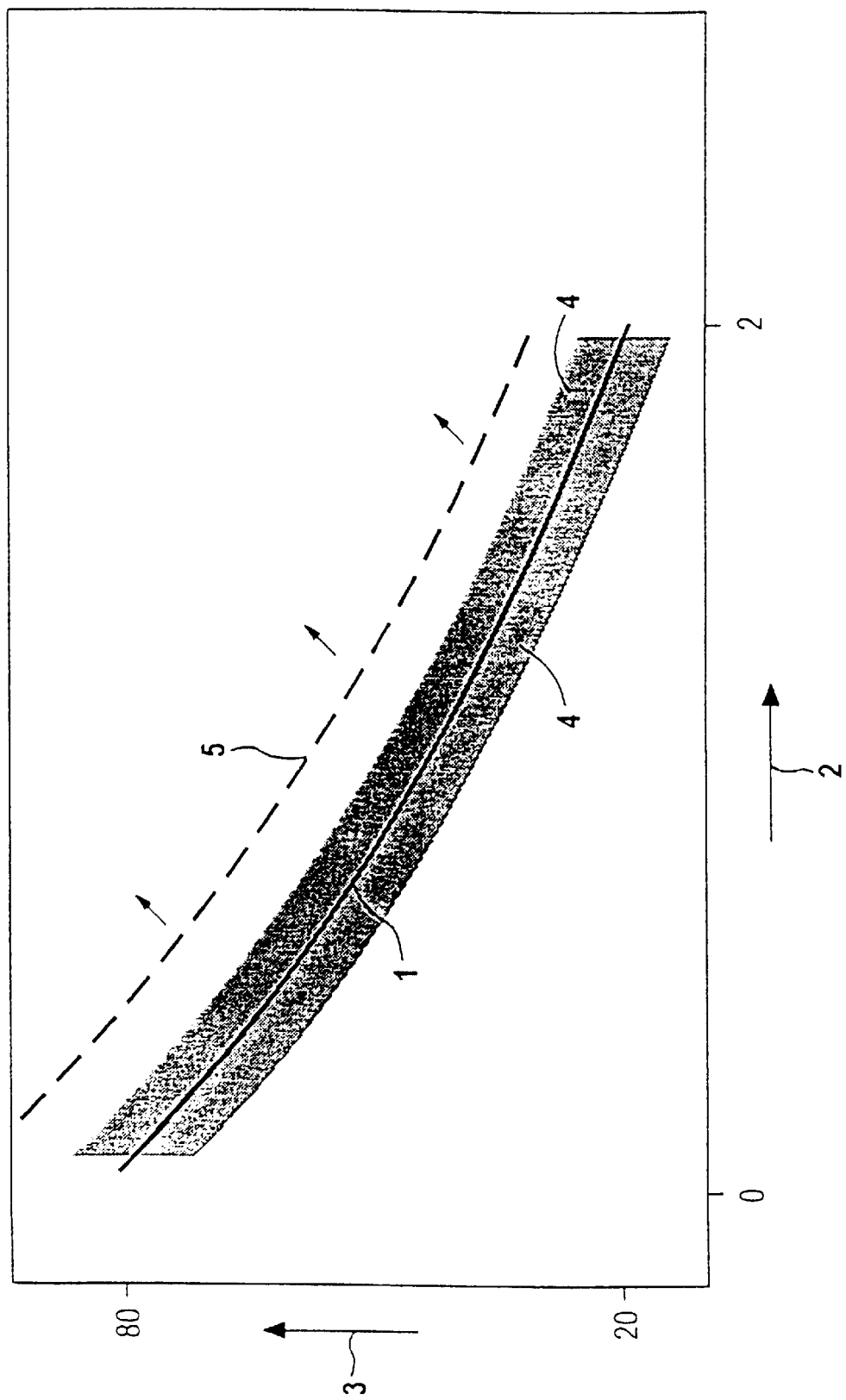

PROCESS FOR PRODUCING A CATALYST BODY

CROSS-REFERENCE TO RELATED APPLICATION

This application is a continuation of copending International Application No. PCT/DE99/02941, filed Sep. 14, 1999, which designated the United States.

BACKGROUND OF THE INVENTION

Field of the Invention

The invention relates to a process for producing a catalyst body, including providing a kneadable and/or shapable compound including titanium dioxide, tungsten trioxide, vanadium pentoxide, aluminum oxide, and/or silicon oxide from starting materials. The kneadable and/or shapable compound is processed into a shaped body by extrusion or by coating of a support body, and the shaped body is then calcined to form an active compound from the compound.

A production process is disclosed, for example, from U.S. Pat. No. 4,085,193 to Nakajima et al. A catalyst body that is produced according to Nakajima et al. is distinguished by a high activity in terms of breaking down nitrogen oxide in a gaseous medium using the selective catalytic reduction process (SCR process). The nitrogen oxides contained in the gaseous medium, also in the presence of oxygen, are broken down by a reducing agent to form water and elemental nitrogen.

German Utility Model DE 296 15 192 U1 also discloses a production process. To apply further active components, the document proposes deep impregnation of the calcined shaped body and a final thermal after-treatment.

Furthermore, German Published, Non-Prosecuted Patent Application DE 35 20 024 A1 discloses a production process for a SCR catalyst that does not contain any titanium dioxide. During production, calcination is carried out in two stages.

In such production processes, the kneadable and/or shapable compound is produced either as an aqueous slurry from the above-mentioned materials in powder form or from the above-mentioned materials in the form of their precursor compounds, such as, for example, oxo acids, by removal of water. Such production is extensively described in the above-mentioned U.S. Patent to Nakajima et al. During production, further auxiliaries and/or fillers may be added to the above-mentioned materials. On one hand, these additions facilitate processing to form the kneadable and/or shapable compound and, on the other hand, have a beneficial effect on the stability of the finished active compound. Examples of such auxiliaries include ceramic fillers or certain organic or organosilicon fibers. In particular, organic fibers are also used as pore-forming agents because the included organic fibers burn during the final calcination process.

A catalyst body based on titanium dioxide, tungsten trioxide, and/or vanadium pentoxide, aluminum oxide, and silicon oxide that has been produced using the prior art process is usually referred to as a deNOx catalyst. Such a catalyst body is used in the form of a shaped body through which medium can flow, for example, in the form of a honeycomb or a plate or in the form of pellets or a bed of bulk material, to break down nitrogen oxides in the exhaust gas from a combustion installation. Because the presence of oxygen also does not represent any problems with regard to the reduction of nitrogen oxides, such a catalyst body is also used to reduce nitrogen oxides in the exhaust gas from a diesel engine. Such a catalyst body can also be used to remove nitrogen oxides from the exhaust gas of a fossil-fired power plant, a refuse incineration plant, or a gas turbine. However, use as a diesel catalyst is becoming increasingly important.

Significantly, temperatures of up to at most 650° C. occur in the exhaust gas from a diesel engine. The catalyst produced in the prior art, however, is substantially only suitable for use at a temperature of up to or below 450° C. if it is to be used to reduce the levels of nitrogen oxides using the SCR process. Above this temperature, increasing deactivation of the active compound takes place. There is an irreversible reduction in its activity. Thereafter, sufficiently high catalytic activity to break down nitrogen oxides is no longer ensured even at lower temperatures. Particularly in the case of a diesel engine that is used to drive a vehicle and is, therefore, exposed to high load changes, the active compound of the catalyst body becomes deactivated relatively quickly.

SUMMARY OF THE INVENTION

It is accordingly an object of the invention to provide a process for producing a catalyst body based on titanium dioxide that overcomes the hereinafore-mentioned disadvantages of the heretofore-known devices and methods of this general type where the catalyst body is able to withstand temperature loads of from 400° C. to 650° C.

With the foregoing and other objects in view, there is provided, in accordance with the invention, a process for producing a catalyst body, including the steps of producing a compound from starting materials including tungsten trioxide, vanadium pentoxide, titanium dioxide, aluminum oxide, and silicon oxide, processing the compound into a shaped body by one of extrusion and coating of a support body, forming an active compound from the compound by calcinating the shaped body at a calcination temperature, and artificially aging the calcined shaped body by a final heat treatment at a temperature, higher than the calcination temperature, of from 620 to 720° C. for a total duration of from 20 to 80 hours. The compound is kneadable and/or shapable.

The invention achieves its objective by the fact that, compared to a production process according to the prior art, the calcined shaped body is subjected to artificial aging by a final heat treatment at a temperature of from 620° C. to 720° C., a temperature that is higher than the calcination temperature, for a total duration of from 20 to 80 hours.

The term calcination is understood as meaning a temperature treatment in which the starting materials combine to form a microstructure of crystallites, in which the volatile components, for example, water of crystallization, are removed, and in which a mechanically stable solid body that undergoes scarcely any change in volume during further heat treatment is formed. Heating the shaped body and holding it at the required calcination temperature, for example 400 to 700° C., for a certain holding time, for example 1 to 20 hours, produces the calcination.

Surprisingly, it has been found that a heat treatment has a positive effect on the calcined shaped body, such that, as a result, the catalyst body acquires a higher resistance to deactivation at high temperatures. It is not currently known what chemical changes to the active compound cause the result. It is possible that the controlled heat treatment leads to a higher degree of linking of the individual components of the active compound of the catalyst body, thus preventing deactivation. It is possible that the treatment also prevents recrystallization of the titanium dioxide from the anatase modification to the rutile modification, with a loss of specific surface area.

In an advantageous configuration of the invention, the final heat treatment is carried out at a temperature of from 620° C. to 720° C. The temperature is significantly higher than the temperature at which the catalyst body is customarily used in SCR applications. The temperature range has proven particularly advantageous with regard to the service life of the catalyst body. A temperature range of from 660° C. to 700° C. has proven particularly advantageous.

In accordance with another mode of the invention, it is advantageous if the overall duration of the final heat treatment is from 20 to 80 hours. The maximum stability of the catalyst body is generally reached after about 35 hours. The heat treatment can be carried out either continuously or discontinuously with interruptions.

In accordance with a further mode of the invention, it is expedient for the production process if the shaped body is dried at a temperature of between 20° C. and 100° C. prior to the calcination.

In accordance with an added mode of the invention, it is advantageous if the shaped body is calcined at a temperature from 400° C. to less than 700° C.

In accordance with a concomitant mode of the invention, the catalyst body includes 65 to 95% by weight of titanium dioxide, 2 to 30% by weight of tungsten trioxide, 0 to 2% by weight of vanadium pentoxide, 0.1 to 10% by weight of aluminum oxide, and 0.1 to 10% by weight of silicon dioxide. Binders and fillers may be added in a conventional manner. It is particularly advantageous with a view to achieving resistance to deactivation at high temperatures if the vanadium pentoxide content is lower than 1.5% by weight.

The catalyst body should be produced such that it has a specific surface area, measured as the BET surface area, of from 30 to 150 m$^2$/g. The pore volume, measured using the mercury penetration process, should be between 100 and 1000 mm$^3$/g, with a monomodal or polymodal pore radius distribution.

The catalyst body produced can be used with a very wide range of geometries. For example, it can be used in honeycomb or plate form, in the form of pellets, or in the form of a bulk bed. The catalyst body is particularly suitable for use as a deNOx catalyst in the exhaust gas from a diesel engine or in the exhaust gas from a gas turbine.

Other features that are considered as characteristic for the invention are set forth in the appended claims.

Although the invention is illustrated and described herein as embodied in a process for producing a catalyst body based on titanium dioxide, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

The FIGURE is a graph indicating the way in which the temperature stability of the catalyst body is dependent on the vanadium pentoxide content and the duration of the final heat treatment according to the invention.

DESCRIPTION OF THE PREFERRED EMBODIMENTS

Referring now to the single FIGURE of the drawing, a summary of a result of the following test is shown:

The exhaust gas from a diesel engine is passed over a catalyst body that is configured as a honeycomb body through which medium can flow. The catalyst body contains 85% by weight titanium dioxide, 10% by weight tungsten trioxide, and a total of 5% by weight silicon dioxide, aluminum oxide, and vanadium pentoxide. The catalyst body was calcined for 10 hours at from 500 to 580° C.

The effect of increasing the temperature stability of the catalyst body by a final heat treatment after conclusion of the calcination process was investigated for various vanadium pentoxide contents of between 0 and 2% by weight.

The calcined catalyst bodies with various vanadium pentoxide contents were respectively subjected to final heat treatments. The heat treatments respectively took place at a temperature of from 650° C. to 700° C. The duration of the heat treatment was varied between 20 and 80 hours.

To determine the temperature stability, the activity of the catalyst with regard to conversion of nitrogen oxide before and after temperature loading from hot exhaust gas was compared. To perform the comparison, first, the activity of the catalyst body at an exhaust gas temperature of 350° C. was measured. Then, the exhaust gas temperature was increased to 650° C. and the catalyst body was exposed to the elevated exhaust gas temperature for 100 hours. Then, the activity of the catalyst body was measured once again at an exhaust gas temperature of 350° C. The results of the measurements are shown in the drawing. The vanadium pentoxide content 2 is plotted on the abscissa, and the duration 3 of the final heat treatment is plotted on the ordinate.

It can be seen that the maximum stability 1 (continuous line) at high temperatures—defined by the difference 0 between the activity of the catalyst body before and after the temperature load—with an increasing level of vanadium pentoxide is reached with a shorter duration 3 of the final heat treatment. For example, at a vanadium pentoxide content 2 of 2% by weight the maximum stability 1 of the catalyst body with regard to temperature loading is achieved after a duration 3 of just 20 hours. By contrast, with a vanadium pentoxide content 2 tending toward 0, the maximum stability 1 of the catalyst body is only achieved after a final heat treatment duration 3 of about 80 hours.

In addition to the maximum stability 1 of the catalyst body with regard to temperature loading, the drawing also shows a tolerance range 4 for good stability. To show the range 4, it is shaded in gray. Sufficient stability with regard to temperature loading is still achieved within the tolerance range 4 compared to a catalyst body that has not undergone a final heat treatment.

If the duration 3 of the final heat treatment is prolonged beyond the duration that is required for maximum stability, the stability of the catalyst body with respect to temperature loading decreases again. The difference between activity prior to loading and activity after loading increases. The behavior is diagrammatically represented in the drawing by the dashed line 5.

Catalyst bodies that have not been subjected to a final heat treatment all have a difference between the activity prior to loading and activity after loading that lies outside the tolerable range. In all the untreated catalyst bodies, a high degree of deactivation of the catalytically active compound entailing a loss of catalytic activity as a result of the influence of the temperature loading was established. However, if, according to the invention, the catalyst body is treated with a final heat treatment, deactivation of such a catalytically active compound as a result of temperature loading of over 400° C. does not occur. Surprisingly, it has been found that, if the duration of the final heat treatment is selected appropriately, the activity of the catalyst body after the temperature loading is still just as high as before the temperature loading. The effect is an amazing result and demonstrates the value of the production process according to the invention.

We claim:

1. A process for producing a catalyst body, which comprises:

producing a compound from starting materials including tungsten trioxide, vanadium pentoxide, titanium dioxide, aluminum oxide, and silicon oxide;

processing the compound into a shaped body by extrusion of or coating of a support body;

forming an active compound from the compound by calcinating the shaped body at a calcination temperature; and aging the calcined shaped body by a final heat treatment at a temperature, higher than the calcination temperature, of from 620 to 720° C. for a total duration of from 20 to 80 hours.

2. The process according to claim 1, wherein the compound is kneadable.

3. The process according to claim 1, wherein the compound is shapable.

4. The process according to claim 1, which further comprises carrying out the aging step by performing the final heat treatment at a temperature of from 660 to 700° C.

5. The process according to claim 1, which further comprises drying the shaped body at a temperature of from 20 to 100° C. prior to the calcination.

6. The process according to claim 1, which further comprises carrying out the forming step by calcinating the shaped body at a temperature of from 400° C. to less than 700° C.

7. The process according to claim 1, which further comprises carrying out the producing step by providing starting materials including from 65 to 95% by weight of titanium dioxide, 2 to 30% by weight of tungsten trioxide, 0 to 2% by weight of vanadium pentoxide, 0.1 to 10% by weight of aluminum oxide, and 0.1 to 10% by weight of silicon dioxide.

8. The process according to claim 7, which further comprises carrying out the producing step by providing starting materials including less than 1.5% by weight of vanadium pentoxide.

9. The process according to claim 1, which further comprises selecting the starting materials to produce the shaped body having from 65 to 95% by weight of titanium dioxide, 2 to 30% by weight of tungsten trioxide, 0 to 2% by weight of vanadium pentoxide, 0.1 to 10% by weight of aluminum oxide, and 0.1 to 10% by weight of silicon dioxide.

10. The process according to claim 9, which further comprises selecting the starting materials to produce the shaped body having less than 1.5% by weight vanadium pentoxide.

* * * * *